United States Patent [19]

Todd et al.

[11] Patent Number: 4,676,970

[45] Date of Patent: Jun. 30, 1987

[54] METHOD FOR PRODUCING METAL SULFIDE AND THE PRODUCT PRODUCED THEREFROM

[75] Inventors: Lamar S. Todd, Amherst; Robert H. Kaiser, Youngstown; Donald R. Hilburger, No. Tonawanda, all of N.Y.

[73] Assignee: Elkem Metals Company, Pittsburgh, Pa.

[21] Appl. No.: 733,973

[22] Filed: May 14, 1985

[51] Int. Cl.$^4$ .................. C01G 45/00; C01G 9/08
[52] U.S. Cl. .................. 423/561 R; 423/561 A; 423/561 B; 423/565
[58] Field of Search .................. 423/561 R, 565, 48, 423/49, 561 B, 99, 89, 138

[56] References Cited

U.S. PATENT DOCUMENTS

| | | | |
|---|---|---|---|
| 2,059,421 | 11/1936 | Waring | 423/565 |
| 3,079,229 | 2/1963 | Garrett et al. | 423/561 R |
| 3,519,492 | 7/1970 | Huml et al. | 423/565 |
| 3,577,231 | 5/1971 | Pesses | 423/565 |
| 3,714,337 | 1/1973 | Garet | 423/561 R |
| 3,725,276 | 4/1973 | Ohkage | 423/565 |
| 3,980,761 | 9/1976 | Thompson et al. | 423/565 |

OTHER PUBLICATIONS

Mellor, J. W., "Inorganic and Theoretical Chemistry" vol. XII, 1932.

*Primary Examiner*—Andrew H. Metz
*Assistant Examiner*—Anthony McFarlane
*Attorney, Agent, or Firm*—Lucas & Just

[57] ABSTRACT

A method for making a fused compound from a metal and a non-metal and more particularly a method for making a metal sulfide is disclosed. The method is particularly advantageous in making manganese sulfide. An excess of metal and recycled compound are used to control sulfur vaporization and a portion of the product is recycled to control the reaction. Conventional equipment can be used in the method.

24 Claims, No Drawings

METHOD FOR PRODUCING METAL SULFIDE AND THE PRODUCT PRODUCED THEREFROM

This invention relates to a method for making metal sulfides and especially manganese sulfide. The method is highly efficient for producing a product of greater purity than heretofore produced in commercial manufacture.

The term fused manganese sulfide as used in the specification and claims herein means a compound manganese monosulfide (MnS).

The earth's crust contains metal sulfides. Alabandite and manganblende are the names given to the natural occurring manganese sulfides. However, the earth's crust contains an insufficient amount of manganese sulfide to meet current and future demands. Manganese sulfide is added to metal parts where the part is destined for machining prior to use. Manganese sulfide facilitates such machining. No viable commercial process exists today for making a pure manganese sulfide.

There is a need within the metal and metal alloy industry to develop a commercially viable method of making metal sulfides especially manganese sulfide.

One method employed to make a fused manganese sulfide in the past has been a submerged arc furnace which utilizes manganese containing ores and sulfur bearing materials. Sulfur vaporization makes this method unacceptable. This is a high volume-low cost method but the fused manganese sulfide product has a low purity, and atmospheric sulfur pollution makes this an unattractive method.

It is well known that sulfur vaporization/sulfur pollution is a major problem in the world today and is a main constituent of acid rain. Sulfur pollution/sulfur vaporization as used in the specification and claims herein means sulfur only or sulfur which has combined with oxygen or other elements and is a gas at atmospheric temperature and pressure.

Precipitating manganese sulfide from an aqueous solution of manganese salt and alkaline sulfide is another known method of making manganese sulfide. This process is plagued by impurities in the manganese sulfide.

Another method of forming manganese sulfide is thermal reduction of manganese sulfate with carbon or hydrogen. This reaction is plagued by sulfur pollution and low purity of the manganese sulfide. Thus, both the precipitating and thermal reduction methods of making a manganese sulfide are not desirable for large scale commercial production.

Calculations with thermodynamic constants show that the direct combination of equal molar quantities of manganese and sulfur to produce a fused manganese sulfide is an extremely exothermic and potentially violent reaction. Starting at room temperature the adiabatic reaction temperature is greater than 2500° C. Such a violent reaction makes the use of this method appear unacceptable. Sulfur vaporization would also be a problem.

A method has now been discovered which produces a pure fused compound from the direct combination of a metal and a non-metal. This method is of particular advantage in producing a highly pure fused manganese sulfide because not only does it control the violent nature of the reaction between the manganese and sulfur, but it also reduces sulfur vaporization. It has been found that this method can be carried out using conventional equipment, and it does not need additional gas or water. The use of conventional equipment greatly reduces the capital outlay needed to implement the present invention, and the elimination of gas and water decreases operating expenses as well as pollution problems. It has also been discovered that the present method produces a product which has a low surface area therefore minimizing the deterioration which products of this nature encounter in the environment.

The method of the present invention is not only applicable to combining manganese and sulfur, but it is also applicable to metal sulfides as well as metal iodides, phosphides and arsenides. By analogy, selenium and tellurium could replace sulfur.

It is essential that the ingredients are solids at room temperature and pressure, react in such an exothermic reaction that the product of the reaction is a liquid, and that upon solidifying any excess of one ingredient, if such excess exists, does not readily dissolve in the product. Any excess reactants form a separate liquid or vapor phase. Upon cooling, the product must form a solid.

The exothermic reaction means that the reaction, once initiated, will be self-sustaining throughout. This is an important aspect because no additional heat is needed to carry out the reaction.

Broadly, the process includes mixing the metal, non-metal and fused metal-non-metal compound, reacting the ingredients, recovering the product and recycling part of the product back to the mixing step.

The components can be blended in any known conventional manner. A low intensity mixer must be used to prevent the creation of thermal energy that might initiate the exothermic reaction. The ingredients must be mixed intimately. Preferably a commercial V blender is used.

Metals which are acceptable for this process besides manganese are zinc, lead, iron, nickel, cobalt, aluminum, chromium, vanadium, rare earth elements, alkali metals and alkaline earth metals. These are only a selected number of metals for illustrative purpose. For best results manganese is used.

It is also possible to utilize the teaching of the present invention to substitute metal alloys for the metallic element of the reaction. For example, ferromanganese could be used instead of manganese.

In order to obtain a highly pure product, a highly pure metal and a highly pure non-metal are used. Preferably both the non-metal and the metal have a purity greater than about 95% and more preferably about 99%. In the case of manganese, such a high purity can be obtained from manganese which has been made from aqueous electrolysis of manganese sulfate solution, and sulfur of such high purity is readily available in the market. It is possible to use the teachings of the present invention with less pure starting materials. It is preferred that the product have a purity greater than about 95% and more preferably about 99%.

The starting ingredients of the present invention must be in particle form. The particles of the ingredients should be of a similar size to minimize segregation during the mixing and the reaction phase. With respect to the manganese and sulfur, it has been found that the particle size should not exceed about 0.5 in. Better results have been obtained with finer particle size such as about 0.25 in. Preferably, the particle size is about 0.25 in. or less. The particle size of the recycled manganese sulfide should be less than about 1.0 in. and preferably below 0.12 in. Best results are obtained when the particle sizes of the manganese, sulfur and recycled manganese sulfide are about 0.03 in.

The molar amount of metal and the molar amount of sulfur in the reaction can be equal; however, in order to control the evolution of sulfur gas from the reaction vessel an excess molar amount of metal is added. About 30% by weight excess metal can be added to the reaction and preferably about 1 to 20% by weight. The most preferred range is 2 to 10% by weight. The amount of excess of metal is expressed as a weight percent of the stoichiometric amount of metal in the mix.

It is possible with the method of the present invention to use an excess amount of sulfur to cause essentially all of the metal to react. If excess sulfur is used, preferably up to about 10% is added. This will cause sulfur gas to evolve; however, if desired, an excess amount of sulfur can be used so that essentially all of the metal reacts. The amount of excess of non-metal is expressed as a weight percent of the total stoichiometric amount of non-metal in the mix.

All of the percentages as used in the claims and the specification herein are weight percents unless otherwise specified.

Because manganese is slightly soluble in molten manganese sulfide, there are some very fine precipitated manganese particles associated with the solidified fused manganese sulfide; however, the majority of the unreacted manganese forms a regulus at the bottom of the reaction vessel. In defining purity of the product as used in the claims and the specification herein, purity of the product does not account for the dissolved manganese or fine manganese particles in the solid mass of the fused metal sulfide.

For the reaction phase of the present invention, any conventional reaction vessel can be used.

It has also been found that a reaction vessel made from conventional materials can be used. It is possible to use pots made from carbon, graphite, cast iron or copper. Preferably, a cast iron pot is used.

To obtain the most pure metal sulfide, oxidation of the product should be minimized. One way to minimize the oxidation of the product is to place a lid or cover on the reaction vessel. Other methods may be employed; however, using a cover is an inexpensive way to prevent such oxidation. Preferably the reaction vessel is covered.

Even though the direct combination reaction of manganese and sulfur is extremely exothermic, a means is needed to initiate the reaction. There are many means to initiate the reaction, an electric wire and a chemical charge to name a few. Preferably, a chemical charge is used, and more specifically aluminum plus barium peroxide.

After the reaction has ended, the fused product and unreacted metal are allowed to solidify. The pure metal regulus in the bottom of the reaction pot is separated from the metal sulfide, and the metal sulfide is crushed and ground in conventional manner. Suitable equipment for coarse grinding includes jaw crushers of the Blake, overhead eccentric or Dodge type, gyratory crushers of the primary, secondary and hydrocone (Allis-Chalmers) type and roll crushers. For a finer grind, ball, rod or pebble mills can be used. Preferably, jaw crushers, hydrocone, and a ball mill are used.

Some of the ground metal sulfide is recycled to the initial mixing stage. The recycled metal sulfide is used to cool and control the reaction. The amount recycled depends upon the amount of metal and sulfur that are present in the first stage. The more metal and sulfur, the more product that must be recycled. About 0% to about 40% of recycled product is found to be acceptable. It is preferred to use about 5 to about 25% and most preferred about 15 to about 20%. The recycle controls and cools the main reaction and allows for the use of conventional equipment in the method of the present invention. The amount of recycle is expressed as a weight percent of the total stoichiometric amount of metal plus non-metal. This does not include any excess metal or non-metal in the mix.

The metal regulus is of sufficient purity that it can be recycled to the first step once it is re-ground.

EXAMPLE I

The following is a typical example of how to employ the method of the present invention to make about 750 pounds of a fused manganese sulfide. In a V blender the following ingredients were mixed for 15 minutes with a nitrogen purge to make the main charge:

TABLE I

| Ingredients | Amount (pounds) |
|---|---|
| Manganese | 502 |
| Sulfur | 274 |
| Manganese Sulfide | 150 |

The manganese was electrolytic manganese in the form of a flake which was ground to a particle size of less than about 0.6 mm in an inert atmosphere. The manganese contained greater than 99.7% manganese, less than 0.25% oxygen, less than 0.03% sulfur and less than 0.005% iron. The amount of manganese used in this example constitutes a 7% excess.

The sulfur was 99.9% pure and was a flake sulfur which ranged between about 3.4 mm to 0.8 mm in size.

The fused manganese sulfide was the product of the present invention which had been ground to about 6.4 mm in size and was about 95% pure manganese sulfide with about 1.5% pure manganese and about 3% of other impurities such as manganese monoxide. The amount of manganese sulfide used in this example constitutes a 20% excess.

The cast iron reaction vessel used for this example had a volume of 17.3 ft$^3$, with 3-inch thick walls. It was conical in shape with an opening of 50 in., a rounded bottom of 12 in. and a depth of 37 in.

To load the pot, five pounds of fused manganese sulfide was placed into the bottom of the vessel prior to the addition of the main charge. Then eight pounds of an equimolar blend of manganese and sulfur was placed on top of the center of the main charge. On top of all the ingredients was placed a charge containing 1 gram of aluminum and 7.5 grams of barium peroxide to initiate the reaction.

A cover was then placed on the vessel. The cover was made of a steel dished head and had a 6-inch hole in the top to allow gases to escape during the reaction. The underside of the cover was lined with plastic mullite. Plastic fire clay refractory sealed the cover to the vessel.

Five minutes after the reaction was initiated, a graphite plate was placed over the opening in the cover to prevent oxidation.

After solidification, the product was removed from the vessel and the fused manganese sulfide was separated from the manganese regulus.

The product, manganese sulfide, had the following composition:

TABLE II

| Compound | Weight % |
| --- | --- |
| Manganese (Mn) | 64.90 |
| Sulfur (S) | 34.01 |
| Oxygen (O) | 0.75 |

The calculated product recovery was 100.8% for manganese and 95.7% for sulfur.

It will be understood that the claims are intended to cover all changes and modifications of the preferred embodiments of the invention herein chosen for the purpose of illustration which do not constitute a departure from the spirit and scope of the invention.

What is claimed is:

1. A method for making a solid metal-non-metal product comprising:
   (a) mixing a metal particulate, a non-metal particulate and a recycled metal-non-metal particulate wherein said metal and said recycled metal-non-metal have the same elementary metal, said non-metal and said recycled metal-non-metal having the same elementary non-metal,
   said metal selected from the group consisting of manganese, zinc, lead, iron, nickel, cobalt, aluminium, chromium, vanadium, rare earth elements, alkali metals and alkaline earth metals,
   said non-metal selected from the group consisting of sulfur, iodine, phosphorus, arsenic, selenium and tellurium,
   said metal and non-metal being mixed in stoichiometric proportions,
   (b) initiating a reaction between said metal and said non-metal thereby forming a liquid metal-non-metal product, said metal-non-metal particulate controlling and cooling the reaction between said metal and said non-metal; and
   (c) recovering a solid metal-non-metal product.

2. The method of claim 1 wherein said metal, said non-metal and said recycled particulate are particles of substantially the same size.

3. The method of claim 1 wherein said-non-metal is sulfur and said recycled particulate is a fused metal sulfide.

4. A method for making a solid metal sulfide product comprising the steps of:
   (a) mixing a metal particulate, a sulfur particulate and a recycled metal sufide particulate wherein said metal particulate and said recycled metal sulfide have the same elementary metal said metal selected from the group consisting of manganese, chromium and ferromanganese;
   (b) initiating a reaction between said metal and sufur thereby forming a liquid metal sufide product, said recycled metal sulfide controlling and cooling the reaction between said metal and sulfur;
   (c) recovering a solid metal sulfide product.

5. The method of claim 4 wherein said metal particulate is a metal alloy.

6. The method of claim 4 wherein the reaction between said metal and said sulfur takes place in a carbon lined vessel.

7. A method for making a solid manganese sulfide product comprising the steps of:
   (a) mixing a manganese particulate,
   a sulfur particulate and
   a recycled manganese sulfide particulate;
   (b) initiating a reaction between said manganese and said sulfur thereby forming a liquid manganese sulfide product, said recycled manganese sulfide controlling and cooling the reaction between said manganese and said sulfur; and
   (c) recovering a solid manganese sulfide product.

8. The method of claim 7 wherein said manganese in said step (a) is in excess of said sulfur and said excess is no more than about 30%.

9. The method of claim 7 wherein said manganese in said step (a) is in excess of said sulfur and said excess is between about 1% to about 20%.

10. The method of claim 7 wherein said manganese in said step (a) is in excess of said sulfur and said excess is between about 2% to about 10%.

11. The method of claim 7 wherein the amount of said recycled manganese sulfide is between about 0% to about 40%.

12. The method of claim 7 wherein the amount of said recycled manganese sulfide is between about 5% to about 25%.

13. The method of claim 7 wherein the amount of said recycled manganese sulfide is between about 15% to about 20%.

14. The method of claim 7 wherein said manganese and said sulfur have a particle size less than about 0.5 in. and said recycled manganese sulfide has a particle size of less than about 1.0 in.

15. The method of claim 7 wherein said manganese and siad sulfur have a particle size of less than about 0.25 in. and said recycled manganese sulfide has a particle size of less than about 0.12 in.

16. The method of claim 7 wherein said manganese, said sulfur and said recycled manganese sulfide have a particle size of about 0.03 in.

17. The method of claim 7 wherein the reaction between said manganese and said sulfur takes place in a cast iron vessel.

18. The method of claim 7 wherein said manganese particulate is ferromanganese particulate.

19. The method of claim 7 wherein said sulfur in said step (a) is in excess of said manganese and said excess is no more than about 10%.

20. The method of claim 8 wherein the amount of recycled manganese sulfide is between about 0% to about 40%.

21. The method of claim 10 wherein the amount of said recycled manganese sulfide is between about 15% to about 20%.

22. The method of claim 20 wherein the sum of the percents excess of said manganese particulate and said recycled manganese sulfide particulate is less than about 50%.

23. A method of making a solid manganese sulfide product comprising the steps of:
   (a) mixing a manganese particulate, a sulfur particulate and a recycled manganese sulfide particulate wherein said manganese is in excess of said sulfur by about 7%, said recycled manganese sulfide is in excess of about 20% and said manganese, sulfur and recycled manganese sulfide having a substantially equal particle size of about 0.03 in.;
   (b) initiating a reaction between said manganese and said sulfur thereby forming a liquid manganese sulfide product, said recycled manganese sulfide controlling and cooling the reaction between said manganese and said sulfur; and (c) recovering a solid manganese sulfide product.

24. A method for making a solid fused metal-non-metal product comprising:
(a) mixing a metal particulate, a non-metal particulate and a recycled metal-non-metal particulate wherein said metal and said recycled metal-non-metal particulate have the same elementary metal, said non-metal and said fused metal-non-metal particulate have the same elementary non-metal, said metal is selected from the group consisting of manganese, chromium and ferromanganese and said non-metal is selected from the group consisting of sulfur and phosphorus, said metal and non-metal are mixed in stoichiometric proportions, (b) intiating a reaction between said metal and said non-metal thereby forming a liquid metal-non-metal product, said recycled metal-non-metal particulate controlling and cooling the reaction between said metal and said non-metal; and (c) recovering a solid metal-non-metal product.

* * * * *

UNITED STATES PATENT AND TRADEMARK OFFICE
CERTIFICATE OF CORRECTION

PATENT NO.   : 4,676,970

DATED        : June 30, 1987

INVENTOR(S)  : Lamar S. Todd et al.

It is certified that error appears in the above-identified patent and that said Letters Patent is hereby corrected as shown below:

Column 5, line 24, change "having" to --have--.

Signed and Sealed this

Twentieth Day of October, 1987

Attest:

DONALD J. QUIGG

Attesting Officer

Commissioner of Patents and Trademarks